United States Patent
Lowell et al.

(10) Patent No.: US 10,520,638 B1
(45) Date of Patent: Dec. 31, 2019

(54) OPTICAL FIBER IN METAL TUBE WITH TERMINATION

(71) Applicant: Prysmian S.p.A., Milan (IT)

(72) Inventors: Mark Edmund Lowell, Bridgewater, NJ (US); Toma Milouchev, Bridgewater, NJ (US)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/160,821

(22) Filed: Oct. 15, 2018

(51) Int. Cl.
*G01V 8/16* (2006.01)
*G02B 6/44* (2006.01)

(52) U.S. Cl.
CPC ............. *G01V 8/16* (2013.01); *G02B 6/4429* (2013.01); *G02B 6/4471* (2013.01)

(58) Field of Classification Search
CPC .................................. G01V 8/16; G02B 6/4429
See application file for complete search history.

(56) References Cited

U.S. PATENT DOCUMENTS

| | | | |
|---|---|---|---|
| 7,269,320 B2* | 9/2007 | Herbst | E21B 47/065 385/100 |
| 7,773,841 B2 | 8/2010 | Varadarajan et al. | |
| 9,874,084 B2 | 1/2018 | Park et al. | |
| 2003/0081916 A1* | 5/2003 | Norris | G02B 6/4465 385/100 |
| 2012/0039359 A1 | 2/2012 | MacDougall et al. | |
| 2012/0039561 A1* | 2/2012 | MacDougall | G01K 11/32 385/12 |
| 2014/0312215 A1* | 10/2014 | Smith | G01K 11/3206 250/253 |
| 2016/0076339 A1* | 3/2016 | Martin | E21B 47/011 166/57 |
| 2016/0153276 A1* | 6/2016 | Park | E21B 19/08 166/380 |
| 2016/0169711 A1* | 6/2016 | Blakley | G01K 1/08 374/137 |

* cited by examiner

*Primary Examiner* — Sung H Pak
(74) *Attorney, Agent, or Firm* — Seed IP Law Group LLP

(57) ABSTRACT

The current disclosure describes a tube-in-tube optical fiber sensor system. A tube-in-tube optical fiber core includes an inner tube, an outer tube and one or more optical fiber sensors contained in the inner tube. The inner tube and the outer tube each include a termination portion about a sensing end of the optical fiber core. The termination portion of the outer tube includes a closed end that is swaged and welded.

16 Claims, 5 Drawing Sheets

OPTICAL FIBER IN METAL TUBE WITH TERMINATION

BACKGROUND

A fiber optic has been used as a sensing element, referred to as an "intrinsic sensors" or as a means for transmitting signals from a sensor, referred to as an "extrinsic sensor," to a signal processing unit. Intrinsic optical fiber sensors can be used to measure strain, temperature, pressure, flow, acoustic information and other parameter quantities through the variations in one or more of the intensity, phase, polarization, wavelength or time delay of the light signal transmitted in the optical fiber. For example, to measure a temperature, an optical fiber may be modified to have evanescent loss that varies with temperature changes. Further, the Rayleigh scattering, Raman scattering or the Brillouin scattering in the optical fibers may be analyzed to detect temperature variations.

Optical fiber sensors have been used for downhole applications in oil/gas wells for distributed temperature sensing (DTS) as well as pressure, flow, and acoustic sensing applications, as disclosed, for example, in U.S. Pat. No. 9,874,084. The fiber optic sensor is well suited for this environment because of its relative resilience to high temperatures and/or high pressure environments that are challenging for other type of sensors, e.g., semiconductor-based temperature sensors. For example, in a borehole, the temperature may be as high as 130° C. and the hydrostatic pressure may be as high as 1000 bar, which will damage semiconductor-based sensors.

An optical fiber sensor may be inserted into a wellbore, e.g., by running along a sidewall of the tubular borehole to measure the temperature, pressure, flow, or other parameters within the wellbore downhole. See, for example, U.S. Pat. No. 7,773,841. An optical fiber may also be pumped into a dedicated monitoring borehole, other than a production wellbore, which is dedicated to measure the earth formation parameters adjacent to the production borehole.

US 2012/0039359 relates to an integrated high temperature downhole DTS (distributed thermal sensing) sensing cable which includes sensing fibers connected to a turn-around section via fusion splices. An inner sleeve, such as a metal tube, is mounted to the sensing fibers and positioned along the length of the sensing fibers ending slightly away from the splice junctions. An elongated outer casing is attached to the inner sleeve toward the terminating end of the sensing fibers. The casing includes an outer armor tube that is affixed to the inner sleeve toward the remote end thereof. The terminating end of the armor tube defines an opening that is positioned away from the sensing fibers. The casing also includes a sealing cap that is affixed to the armor tube, welded to the armor tube.

U.S. Pat. No. 7,269,320 (AFL) provides a fiber optic cable for use in temperature measurement in the control line of an oil well having a pair of optical fibers connected by a miniature bend at one end. The miniature bend is surrounded by a protective casing. The fibers and the protective casing are contained within a tube that may be made from a metal. The tube includes a seal at its terminating end. A jacket may surround the seal and the tube.

The already cited U.S. Pat. No. 9,874,084 discloses a coiled tubing systems, i.e. a relatively small diameter continuous tubing string, to deploy more instrumentation into the wellbore, particularly pressure and temperature sensors. An end cap assembly is welded in place at the bottom hole end of the coiled tubing string containing, for example, two metal conduits containing fiber optic sensors. The sealing is accomplished by providing a flat weldable surface to which the end of the coiled tubing string is welded.

BRIEF SUMMARY

Techniques of this disclosure are directed to optical fiber sensor systems for wellbore sensing applications or other application scenarios that require protection of the optical fiber from the environment conditions, e.g., the hydrogen, the temperature, the corrosive materials of the environment conditions. The optical fiber sensor systems include a tube-in-tube optical fiber core. The tube-in-tube optical fiber core includes an inner tube, an outer tube and one or more optical fiber sensors, e.g., intrinsic optical fiber sensors, contained in the inner tube. The inner tube is contained in the outer tube. The inner tube and the outer tube both include a termination portion about the sensing end of the optical fiber core. A sensing end refers to an end of the optical fiber core that is deployed in the sensing site. In an embodiment, the termination portion of the outer tube includes a closed end which is sealed. The closed end of the outer tube is formed through swaging to have a convex external shape, such as a dome-shape or a cone-shape with a smooth apex. The closed end of the outer tube is sealed through welding, e.g., laser welding or tungsten inert gas ("TIG") welding. The termination portion of the inner tube includes a closed end or a quasi-closed end, which supports the optical fiber sensors to stay contained within the inner tube. Optionally, the closed end of the inner tube is sealed through welding. Optionally, the termination portion of the outer tube includes a plug member adjacent to the closed end of the outer tube. In an embodiment, the plug member is inserted into the outer tube before the closed end is formed such that the closed end formation operation fits the plug member tightly into an internal recess portion of the closed end. The plug member helps to close and/or seal the closed end of the outer tube.

In an embodiment, the closed end of the outer tube is formed through swaging. The swaging process leads to an external surface of the closed end that has a smooth transition throughout the external surface and between the external surface of the closed end and an adjacent tubular portion of the termination portion of the outer tube.

In some embodiments, the end of the inner tube is formed by one of crimping or swaging. In some embodiments, the end of the inner tube is sealed. In other embodiments, the end of the inner tube may not be fully closed and is not sealed, which is referred to as "quasi-closed."

The dome-shaped closed end of the outer tube has an enhanced mechanical characteristic to resist high pressures or strains in the borehole applications. The welded ends of the outer tube and/or the inner tube prevent undesired fluids, e.g., hydrogen, from permeating into the tubes and/or contacting the optical fiber. Further, the swaging or crimping processes are relatively simple to implement on the tube-in-tube structure, and are thus cost effective.

BRIEF DESCRIPTION OF THE DRAWINGS

Aspects of the present disclosure are best understood from the following detailed description when read with the accompanying figures. In the drawings, identical reference numbers identify similar elements or acts unless the context indicates otherwise. The sizes and relative positions of elements in the drawings are not necessarily drawn to scale. In fact, the dimensions of the various features may be arbitrarily increased or reduced for clarity of discussion.

DETAILED DESCRIPTION

It will be appreciated that, although specific embodiments of the subject matter of this application have been described herein for purposes of illustration, various modifications may be made without departing from the spirit and scope of the disclosed subject matter. Accordingly, the subject matter of this application is not limited to the specific embodiments described in this disclosure.

In the following description, certain specific details are set forth in order to provide a thorough understanding of various aspects of the disclosed subject matter. However, the disclosed subject matter may be practiced without these specific details. In some instances, well-known structures and methods of attaching structures have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, particular features, structures, or characteristics may be combined in any suitable manner in one or more aspects of the present disclosure.

Reference is now drawn to the drawings wherein depicted elements are not necessarily shown to scale.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the invention.

Figure 1:
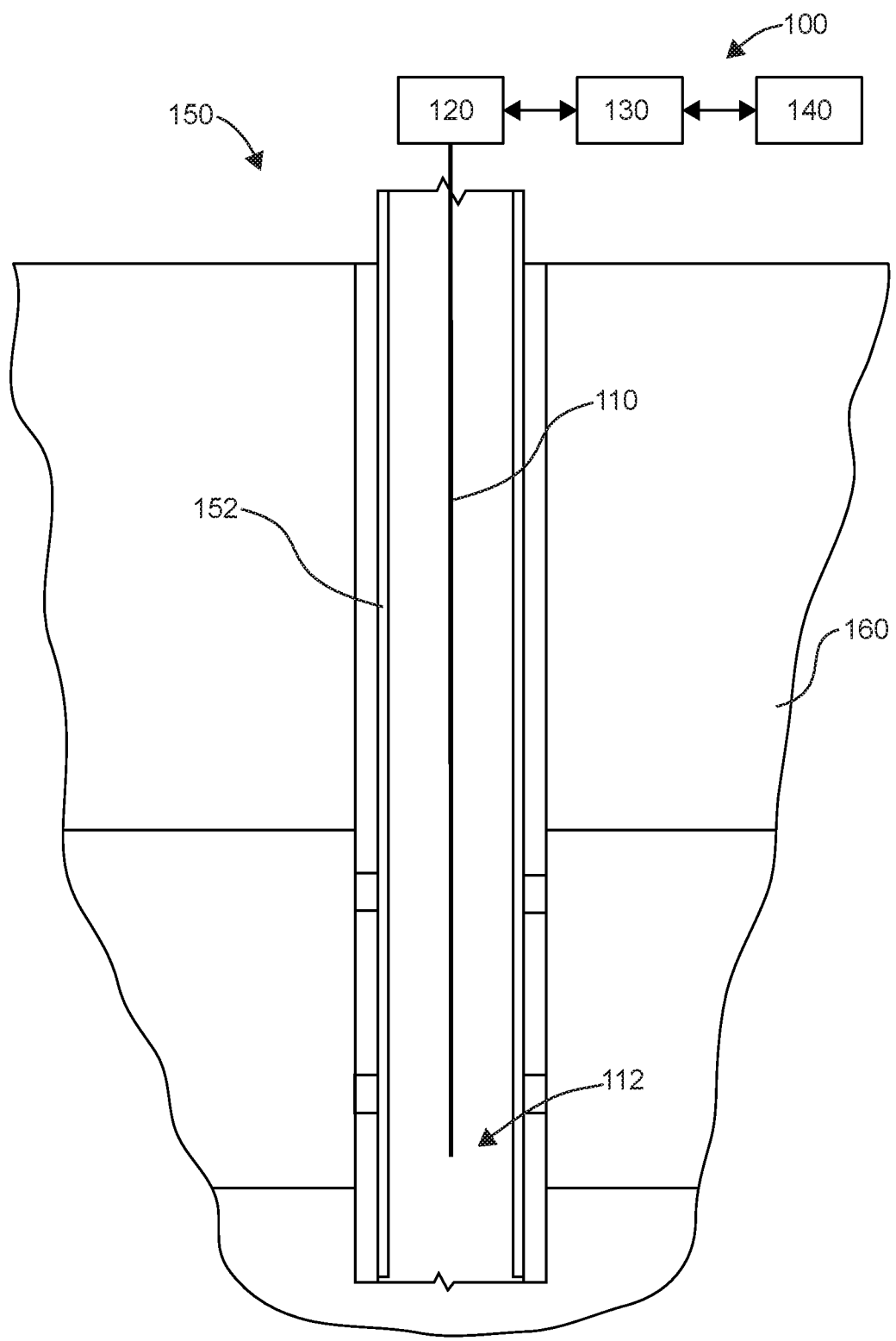
FIG. 1 illustrates a cut-away side view of an example optical fiber sensor system in a wellbore sensing application according to embodiments of the disclosure.

FIG. 1 shows an example sensing application scenario of an optical fiber sensor system 100. Referring to FIG. 1, the optical fiber sensor system 100 includes a fiber cable 110, a cable dispensing unit 120, an optical control unit 130 and a processing unit 140. The fiber cable 110 may include one or more intrinsic optical fiber sensors, one or more extrinsic optical fiber sensors, or both intrinsic and extrinsic optical fiber sensors therein. The optical fiber sensors may be contained in an optical fiber core in a fiber-in-metal tube ("FIMT") configuration. The FIMT or additional tube(s) may be encapsulated with a protective extruded polymer coating, referred to as a "jacket," e.g., a jacket made of medium-density polyethylene ("MDPE"), fluorinated ethylene propylene (FEP), polypropylene (PP) or perfluoroalkoxy alkane (PFA), which provides mechanical protections. Details of the fiber cable 110 are further described herein.

The cable dispensing unit 120 is configured to deploy the fiber cable 110 into a sensing site 150, where the relevant parameters of the sensing site 150 are sensed by the optical fiber sensors contained in the fiber cable 110. Specifically, a sensing end 112 of the optical fibers of the fiber cable 110 are deployed as the distal end from the cable dispensing unit 120. In the description herein, a sensing end refers to an end of the fiber cable 110 or an optical fiber contained in the fiber cable 110 that are deployed into the sensing site 150 away from the cable dispensing unit 120. A sensing end does not mean that an optical fiber senses the environment only through the sensing end. As will be appreciated, in a distributed sensing configuration, a whole distance of an optical fiber sensor may be used for sensing the environment conditions, e.g., temperature. The environment conditions may involve temperature, pressure, flow, acoustic data or other data within or adjacent to the sensing site 150. The deployment may be implemented through any suitable approaches and all are included in the disclosure. For example, the fiber cable 110 may be deployed into the wellbore 150 through pumping a fluid or through a tubular.

The sensing site 150 may be a sub-sea or land-based production wellbore drilled for producing liquid (e.g., crude oil) or gas (e.g., natural gas) from the earth formation 160 or for injecting fluid into the earth formation 160, e.g., into the shale formation in a shale wellbore. The sensing site 150 may also be a monitoring borehole that is configured to monitor the seismic information of an existing or planned wellbore. The sensing site 150 may be a wellbore under drilling or a wellbore established for production.

In an example, as shown in FIG. 1, the sensing site 150 is a wellbore that includes a hollow casing 152, where the fiber cable 110 is dispensed through to detect parameters within the wellbore 150, e.g., the pressure or the temperature within the casing 152. In other examples, the fiber cable 110 may be deployed through the hollow casing 152 of the wellbore 150 into the earth formation 160 adjacent to the wellbore 150.

The optical control unit 130 generally includes an optical coupler, a light source, and an optical signal receiver. In operation, the light source generates and injects optical signals into the optical fiber sensors of the fiber cable 110. The optical signals transmitted back from the optical fiber sensors are received by the optical signal receiver and are processed by the processing unit 140.

Figure 2:
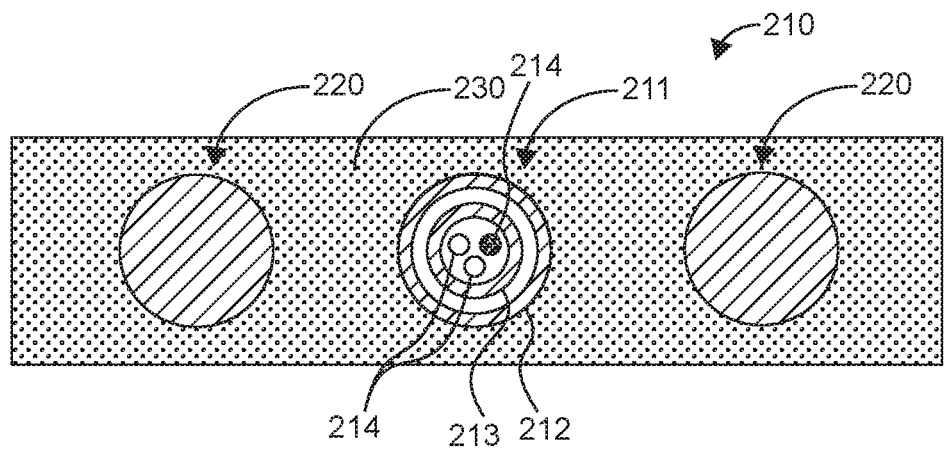
FIG. 2 is a transverse-sectional view of an example optical fiber sensor cable according to embodiments of the disclosure.

FIG. 2 shows a cross-sectional image of an example fiber cable 210. As shown in FIG. 2, the example fiber cable 210 includes an optical fiber core 211 that includes at least one metal tube (two metal tubes 212, 213 shown as an illustrative example) and at least one optical fiber 214 (three shown as an illustrative example) within the at least one metal tube 212. As FIG. 2 shows the fiber cable itself without the sensing application/configuration, and the optical fibers 214 are not all necessarily configured as sensors, the optical fibers 214 are referred to as "optical fibers" not "optical fiber sensors." However, it should be appreciated that the "optical fiber" and the "optical fiber sensor" as referred to herein may not necessarily indicate any structural difference or differentiation and may be used interchangeably.

The fiber cable 210 also includes one or more strength members 220, e.g., bumper bars or stranded steel ropes, adjacent to the optical fiber core 211. FIG. 2 shows, as an illustrative example, that two strength members 220 are positioned by two opposite sides of the optical fiber core 211 in a rectangular or square flatpack configuration, which is not limiting. In other embodiments, more than two strength members 220 are positioned surrounding the optical fiber core 211 in an example round or square profile of the fiber cable 210. In an embodiment, the example strength members 220 are galvanized improved plow steel ("GIPS") or other suitable galvanized or stainless steel materials. The strength members 220 improve the mechanical characteristics of the fiber cable 210 in, e.g., tensile performance, crush resistance and impact energy resistance or other mechanical characteristics. The stranded steel ropes or bumper bars are provided as example strength members in the fiber cable 210 of flatpack configuration. Additionally or alternatively, the fiber cable 210 may include other strength members, like a rode bar surrounded by optical fiber cores 211.

In an embodiment, one or all of the strength member 220 can be replaced by an insulated electric conductor.

The optical fiber core 211 and the strength member 220 are encapsulated within a jacket layer 230. In an embodiment, the jacket layer 230 is an extruded polymer coating that provides mechanical protection to one or more of the optical fiber core 211 or the strength member 220. For example, the extruded polymer coating is medium-density polyethylene ("MDPE") or other extruded polymer materials. As such, the example fiber cable 110 is referred to as a tube encased fiber ("TEF"). The metal tubes 212 and the extruded polymer coating/encapsulation jacket layer 230 function together to make the TEF cable 210 resilient to corrosive fluid, high temperature and high pressure in the harsh wellbore sensing site 150.

Figure 3:
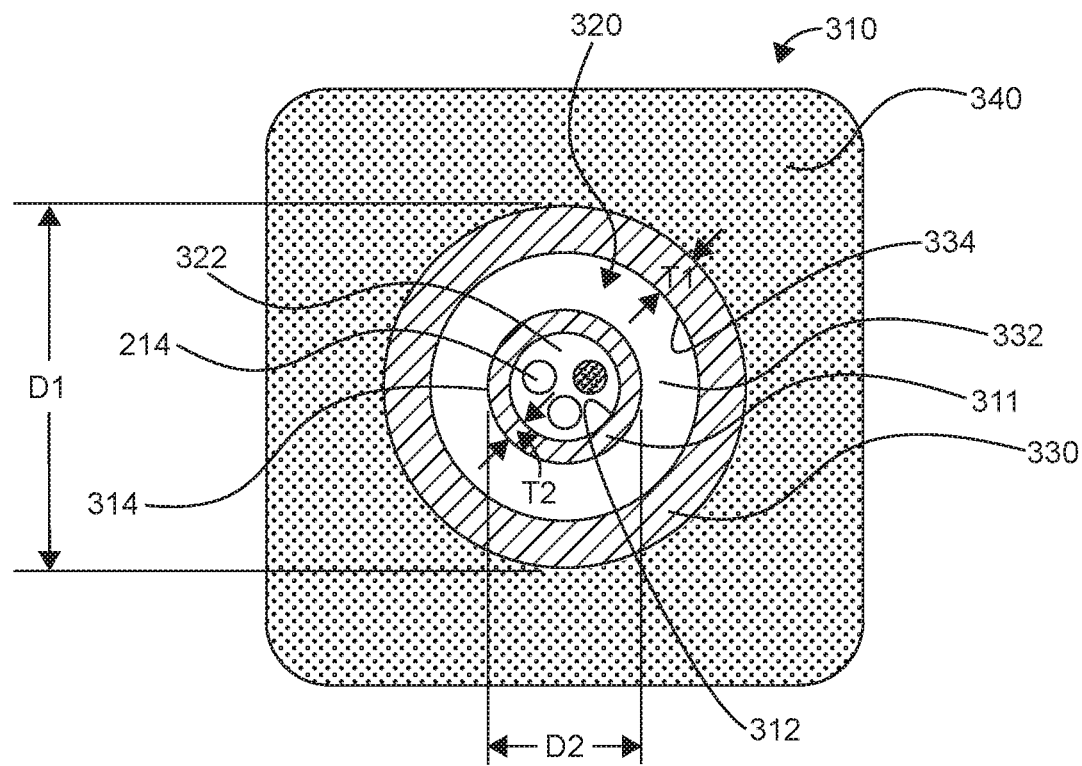
FIG. 3 is a transverse-sectional view of an example tube-in-tube optical fiber core of the example optical fiber cable of FIG. 2 according to embodiments of the disclosure.

FIG. 3 shows an example optical fiber core 310. Referring to FIG. 3, the optical fiber core 310 has a tube-in-tube structure encapsulated within a jacket 340. Specifically, an inner tube 311 contains one or more optical fibers 214 therein (three shown as an illustrative example), which are referred to together as a fiber in metal tube ("FIMT") 320 configuration. In an embodiment, a filler material, e.g., a filler gel, is positioned between the optical fibers 214 and internal sidewall 312 of the inner tube 311. The filler material 322 supports the optical fibers 214 to remain at relatively fixed positions within the inner tube 311. The filler material 322 also provides cushioning to the optical fibers 214 against one another or against the internal sidewall 312 of the inner tube 311. The filler material 322 may be thixotropic gel, grease compounds or other suitable materials that includes preferred viscosity, thermal expansion properties or other characteristics that is suitable for borehole sensing applications. In an embodiment, the filler material 322 is selected to fit different temperature ranges of the wellbore 150.

In an embodiment, an outer sidewall 314 of the inner tube 311 includes one or more coating layers (not shown for simplicity). For example, the coating materials may include carbon, tin, nickel, polymer or other suitable materials. The coating layers may provide a barrier to hydrogen permeation and/or may provide an extra mechanical protection to the inner tube 310, e.g., in the manufacturing process.

In another embodiment, the inner tube 311 does not contain gel filler material 322. Instead, an inert/noble gas, e.g., nitrogen or argon, fills the space/gap between the optical fibers 214 and the internal sidewall 312 of the inner tube 311.

The FIMT 320 is contained in an outer tube 330. In an embodiment, the FIMT 320 is substantially centralized within internal space 332 of the outer tube 330 through a supporting layer (not shown for simplicity), referred to as a belt layer. The belt layer may include high temperature polymer materials like fluoroethylenepropylene ("FEP"), perfluor alkoxy ("PFA"), fluoropolymer resin (e.g., ECA 3000), ethylenechlorotrifluoroethylene ("ECTFE"), polyvinylidene fluoride ("PVDF") or other suitable materials.

In another embodiment, there is no belt layer between the FIMT 320 and the outer tube 330. Instead, the inner space 332 of the outer tube 330 is filled with air or an inert/noble gas, e.g., nitrogen or argon. In a further embodiment, the inner space 332 of the outer tube 330 is partially filled with inert gas/air and partially filled with a belt layer of high temperature polymer.

The optical fibers 214 may include one or more single mode fibers ("SMF") or multi-mode fibers ("MMF"). The optical fibers 214 may be configured as sensing elements in distributed temperature sensing ("DTS"), distributed acoustic sensing ("DAS") or other sensing applications. The optical fibers 214 may or may not be encapsulated with a jacket layer (within the inner tube 311) depending on the sensing application design and/or the conditions of the sensing site 150. In an embodiment, the optical fibers 214 are intrinsic optical fiber sensors. In other embodiments, the optical fibers 214 may include the optical data transport means for extrinsic sensors.

In some embodiments, the outer tube 330 is one of 316L stainless steel, 304L stainless steel, A825 alloy (nickel-iron-chromium), or A625 alloy (nickel-chromium-molybdenum-niobium). These materials have high strength, excellent fabricability and outstanding corrosion resistance. The A825 alloy and A625 alloy may be more suitable than the 304L and 316L stainless steel for those sensing sites 150 that have higher temperature and/or pressure conditions, e.g., the sub-sea wellbores. However, the 304L stainless steel and 316L stainless steel provide excellent cost-effective solutions with acceptable performance. The outer diameter D1 of the outer tube 330 is in a range between about 3 mm to about 10 mm. In an embodiment, the outer diameter D1 is about 6 mm. The thickness T1 of the outer tube 330 is in a range between about 0.3 mm to about 2 mm. In an embodiment, the thickness T1 is about 1 mm.

In some embodiments, the inner tube 311 is one of 316L stainless steel, 304L stainless steel, A825 alloy, or A625 alloy. The inner tube 310 may include a same material as the outer tube 330 or may include a different material. The outer diameter D2 of the inner tube 311 is in a range between about 1.6 mm to about 4 mm. In an embodiment, the outer diameter D2 is about 3 mm. The thickness T2 of the inner tube 311 is in a range between about 0.15 mm to about 0.3 mm. In an embodiment, the thickness T2 is about 0.2 mm.

Figure 4:
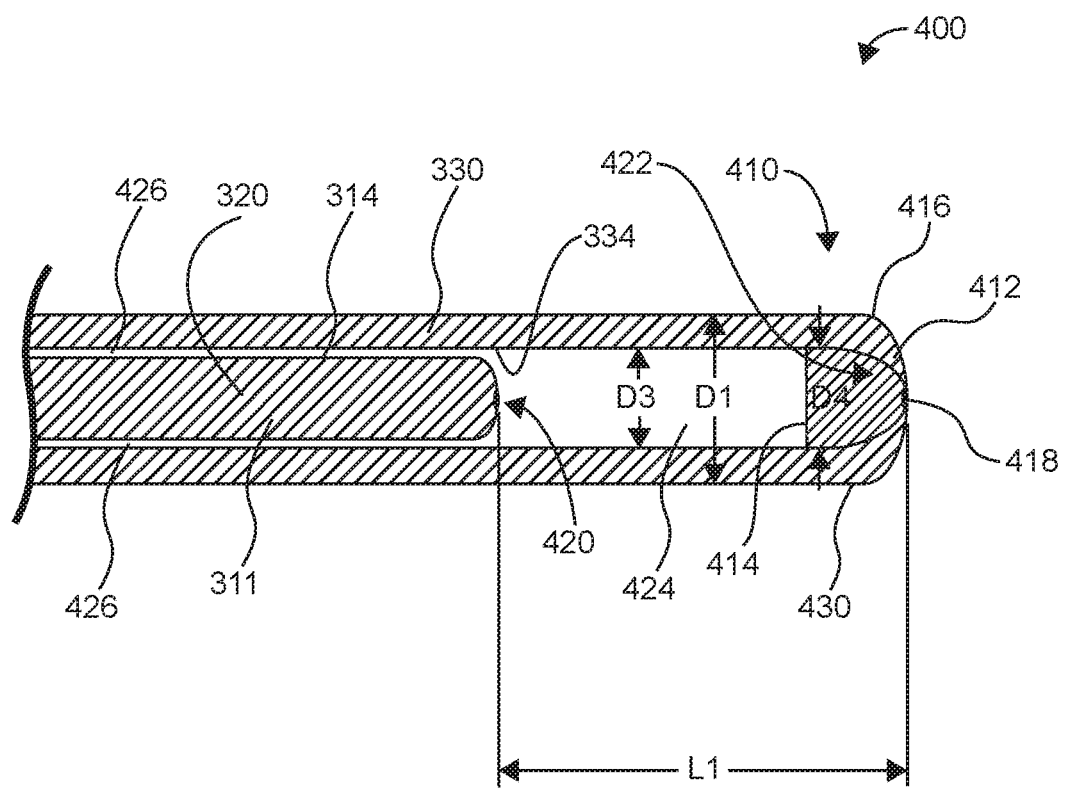
FIG. 4 is a side partial cross-sectional view of an example tube-in-tube optical fiber core according to embodiments of the disclosure.
Figure 5A:
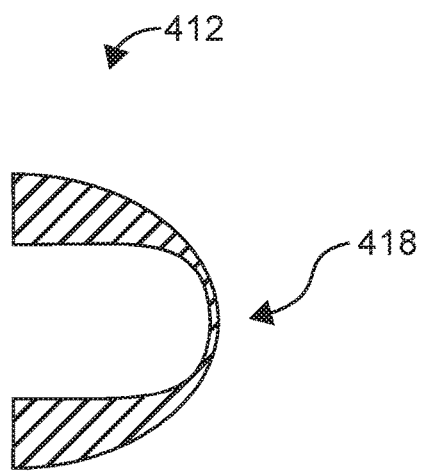
FIGS. 5A-5D are several example shapes of a closed end of an outer tube according to embodiments of the disclosure.
Figure 5B:
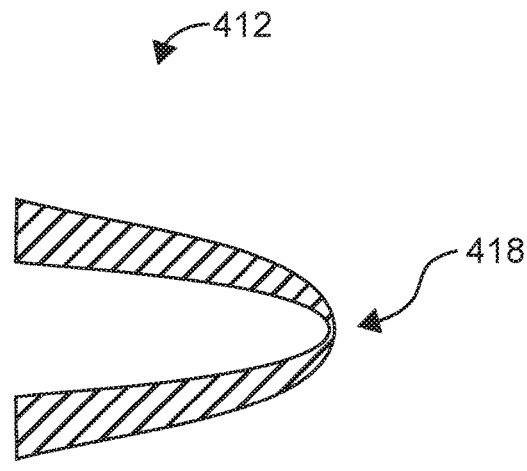
Figure 5C:
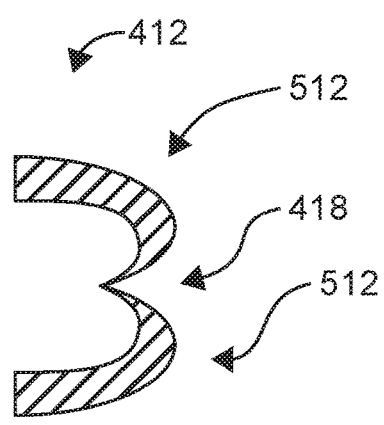
Figure 5D:
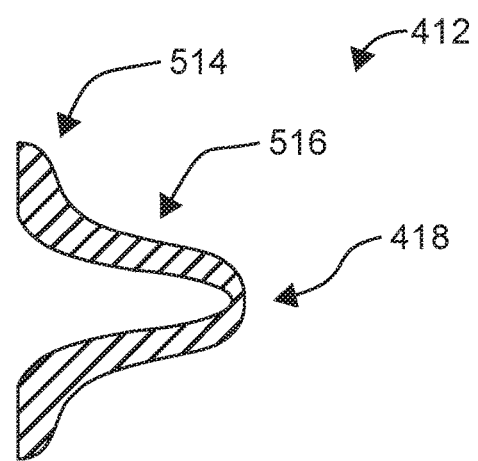

FIG. 4 shows a sectional view of a sensing end (or "first end") 400 of the example tube-in-tube structure of FIG. 3. As shown in FIG. 4, the sensing end 400 includes a termination portion 410 of the outer tube 330, referred to as "outer termination," and a termination portion 420 of the inner tube 311, referred to as "inner termination." The outer termination 410 includes a closed end 412, a tubular portion 430 and a plug member 414 adjacent to the closed end 412. The tubular portion 430 includes a same outer diameter D1 as the rest of the outer tube 330 other than the termination portion 410. In an embodiment, the closed end 412 includes a smooth transitional external portion 416, whose diameters continually decrease from the outer diameter D1 of the tubular portion 430 until reaching a closing point 418 where portions of the outer tube 330 meet to substantially close or minimize a gap on the smooth transitional external portion 416. The closed end 412 is further sealed by a welding process, e.g., a laser welding or a TIG welding process. As such, the smooth transitional external portion 416 of the closed end 412 includes a convex shape, and the closed end 412 also includes an internal concave portion 422 that corresponds to the convex external shape. In some embodiments, as shown in FIG. 4, the plug member 414 at least partially fits into the concave portion 422 of the closed end 412 and/or at least partially fits into the tubular portion 430. Specifically, the plug member 414 abuts the internal sidewall 334 of the tubular portion 430 with an interference fit. In some embodiments, the plug member 414 abuts the internal sidewall 334 of the tubular portion 430 that is adjacent to the closed end 412, but does not fully fit into the concave portion 422. That is, there may be a gap (not shown for simplicity) between the plug member 414 and the closed end 412. In an embodiment, a length of the plug member 414 ranges from about 6.35 mm to about 12.7 mm.

In some embodiments, the plug member 414 is optional and may be eliminated from the termination portion 410 of the outer tube 330.

In some embodiment, there is a gap/distance 424 between the termination portion 420 of the inner tube 311 and the termination portion 410 of the outer tube 330. The gap 424 functions, among others, to protect the FIMT 320 from mechanical impacts received at the termination portion 410 of the outer tube 330. The gap 424 also improves fabrication flexibility by allowing more spacing budget between the termination portion 420 and the termination portion 410 such that the process of forming the termination portion 410 of the outer tube 330 will not detrimentally impact the termination portion 420. In an embodiment, a length L1 of the gap 424 is within a range between about 6.35 mm to about 25.4 mm. In an embodiment, the length L1 is about 12.7 mm. FIG. 4 shows that the length L1 is measured without considering the plug member 414, which is not limiting. In some embodiment, the length L1 is measured from the termination portion 420 to a proximal point of the plug member 414.

In some embodiments, there is a sidewall gap 426 between the external sidewall 314 of the inner tube 310 and the internal sidewall 334 of the outer tube 330. The sidewall gap 426 functions to protect the FIMT 320 from mechanical impacts received at and/or transmitted from the outer tube 330. For example, the sidewall gap 426 prevents vibrations of outer tube 330 from reaching or impacting the FIMT 320. The sidewall gap 426 also protects the inner tube 310 and/or the coating layers thereon from being damaged by the roughness, if any, of the internal sidewall 334 of the outer tube 330.

In an embodiment, the sidewall gap 426 is a first part of the inner space 332 (FIG. 3) of the outer tube 330 and is filled with one or more of an inert gas, air, or a polymer belt layer. The gap 424 is a second part of the inner space 332 and is filled with one or more of an inert gas, air, or a polymer belt layer. In some embodiments, the sidewall gap 426 and the gap 424 are filled with different materials. For example, the sidewall gap 426 is at least partially filled with a polymer belt layer and the gap 424 is filled with an inert air, e.g., nitrogen or argon.

In an embodiment, the closed end 412 of the termination portion 410 is formed through one or more mechanical tube end formation processes, e.g., swaging, tube coining or crimping. In some embodiments, a swaging process to form the swaged end 412 is preferred because the swaging process is capable of making smooth transitional external portion 416 from the tubular portion 430 to the closing end 412 and throughout the smooth transitional external portion 416 until the closing point 418. The smooth transitional external portion 416 helps to release stresses on the closed end 412. On the other hand, a crimping process may form a closed end 412 with some sharp angles, corners or edges which suffer from higher curvature and mechanical stresses as compared to a smooth transition surface. However, in some less demanding application scenarios, a crimped end 412, e.g., made from a crimping process, may be acceptable. In the description herein, it is assumed for the sake of illustration that the closed end 412 is swaged, e.g., formed through a swaging process.

In some embodiments, the closed end 412 is sealed with a welding process such that any minor gap or openings resultant from the swaging process will be joined or sealed. The welding may be implemented through laser beam welding, gas tungsten arc welding (or tungsten insert gas welding) or other suitable welding techniques. In the welding process, optionally, the plug member 414 may serve as part of the base metal, e.g., the plug member 414 being a same metal material as the outer tube 330, or as a filler metal, e.g., to strengthen the joint at the closing point 418.

In some embodiments, the closed end 412 includes a convex external shape. FIGS. 5A-5D show example external shapes of the closed end 412. As shown in example 5A, the closed end 412 is substantially dome-shaped or hemispherical. The dome-shaped closed end 412 is beneficial in that the smooth transition from the tubular portion 430 to the closed end 412 is achieved throughout the termination portion 410. In example 5B, the closed end 412 is substantially cone-shaped with a relatively smooth transition at the closing point 418, e.g., the apex portion of the cone shape. That is, the apex portion 418 is relatively rounded instead of being a sharp point. In example 5C, the closed end 412 includes a multi-dome shape, shown as two domes 512. The multi-dome shape of 5C may be formed intentionally or unintentionally through imperfect process control of the swaging process. However, the smooth transitions between the multiple dome portions 512 and between each dome portion 512 and the tubular portion 430 of the termination portion 410 ensure that the multi-dome profile of the example 5C is acceptable in some application scenarios. In the example of 5D, the closed end 412 is hat-shaped and includes a brim portion 514 proximal to the tubular portion 430 and a dome portion 516 distal to the tubular portion 430. The transitions between the brim portion 514 to the tubular portion 430 (not shown), and between the brim portion 514 and the dome portion 516, are relatively smooth, such that the mechanical stress on the closed end 412 is relatively released. The swaging process is suitable to achieve the example convex shapes of FIGS. 5A-5D and other suitable convex shapes of the closed end 412.

FIGS. 5A-5D show some example shapes of the closed end 412, which are not meant to limit the scope of the disclosure. The closed end 412 may also include other profiles, like a pyramid shape, a stagger shape, a flat-end shape, a prism shape, a cylinder shape or various combinations thereof, which are all included in the disclosure.

Referring back to FIG. 4, the termination portion 420 of the inner tube 311 may include a closed end 420 (not separately referenced for simplicity) that is formed similarly to the closed end 412 of the outer tube 330. As such, the descriptions about the closed end 412 similarly apply to the closed end 420. In an embodiment, the termination portion 420 of the inner tube 310 does not include a plug member.

Further, in an embodiment, the end 420 of the inner tube 311 may not be sealed. That is, the end 420 is formed through a mechanical end closing process like one or more of swaging, crimping or tube coining, and is not sealed, e.g., not welded. Therefore, the end 420 may include small gaps although the gaps are sufficiently small such that the optical fibers 214 and the gel filler material 322 do not extend out of the end 420. In the description herein, the term "quasi-closed end" is used to refer to the scenario that the end 420 of the inner tube 310 is closed by a mechanical tube end closing process but is not sealed.

The end 420 of the inner tube 311 may be closed using a same mechanical end closing process as the closed end 412 of the outer tube 330 or may be closed using a different mechanical end closing process. In an embodiment, the closed end 412 is swaged, e.g., formed through swaging, and the end 420 of the inner tube 311 is crimped, e.g., formed through crimping.

Figure 6:
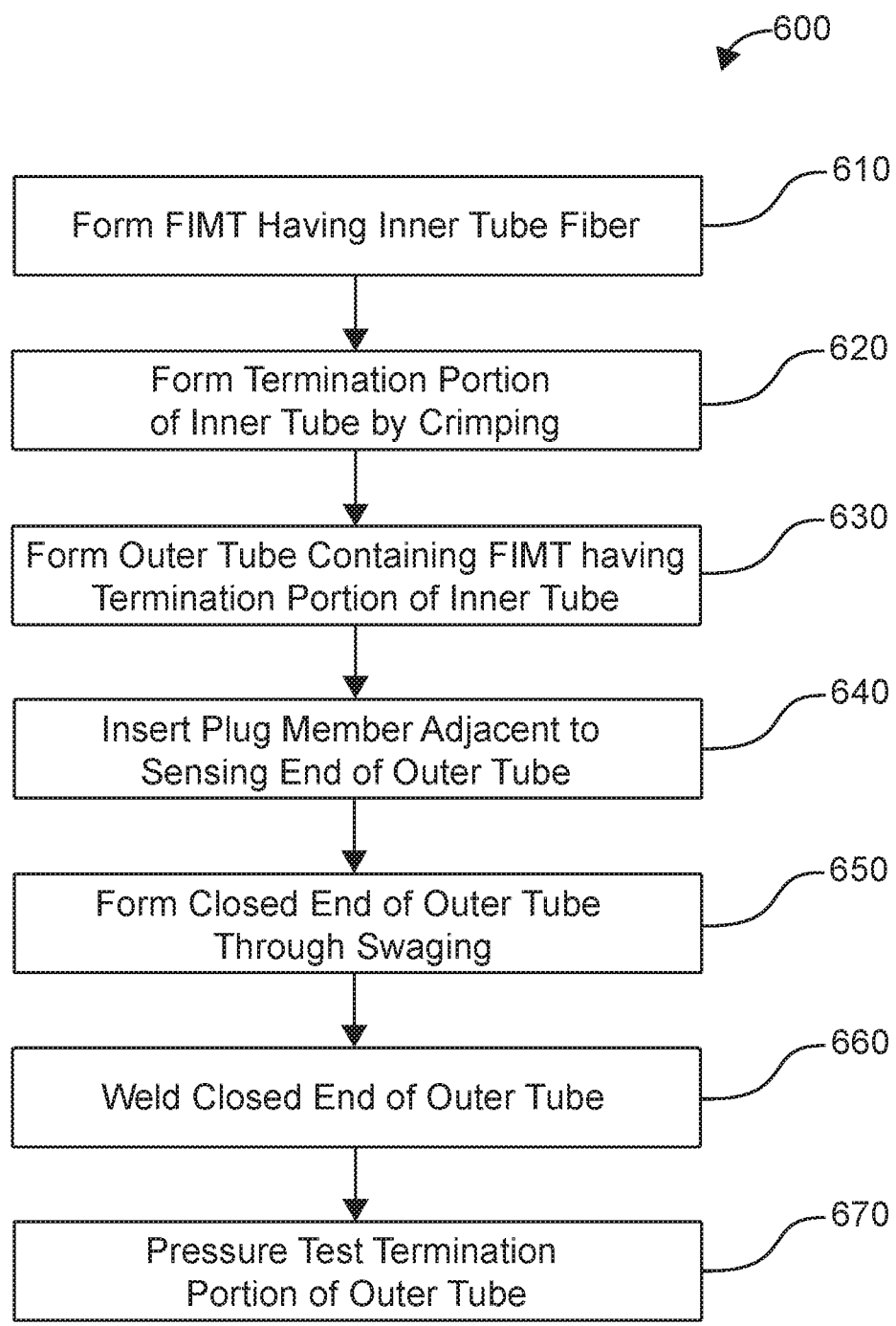
FIG. 6 is an example fabrication process according to embodiments of the disclosure.

FIG. 6 shows an example process. Referring to FIG. 6, in example operation 610, an FIMT 320 is formed. The FIMT 320 may be formed using any techniques and all are included in the disclosure. For example, in an embodiment, optical fibers 214 are put on top of a flat metal tape designed for the inner tube 311. The flat metal tape is formed around the optical fibers 214 into a round tube. Filler material 322, like a gel material, is continuously injected after the round tube is formed. The round tube is then laser welded to form the FIMT structure.

In example operation 620, a sensing end 420 of the FIMT structure 320 is closed using a mechanical end closing process, e.g., crimping, to form a termination portion 420 of the inner tube 311. The crimping substantially closes the crimped end 420 such that the filler material 322 and the optical fibers 214 are held within the inner tube 311.

In example operation 630, an outer tube 330 is formed containing the FIMT 320 that includes the termination portion 420. The outer tube 330 may be formed using any techniques, which are all included in the disclosure. For example, the FIMT 320 that includes the termination portion 420 of the inner tube 311 inner tube is put on top of a flat metal tape that is designed for the outer tube 330. The termination portion 420 of the inner tube 311 is positioned about 12.7 mm to about 25.4 mm (depending on whether a plug member 414 is used) off a first edge of the metal tape. The flat metal tape is formed around the inner tube into a round tube. The round tube is then TIG welded to form the outer tube 330 with a first end 412 of the outer tube 330 formed by the first edge. The first end 412 of the outer tube is designed to be the sensing end.

In example operation 640, optionally, a plug member 414 is inserted into the outer tube 330 through sensing end 412. The plug member 414 is positioned adjacent to the sensing end 412. In an embodiment, the diameter D4 of the plug member (see FIG. 4) is initially about 0.05 mm larger than the internal diameter D3 of the outer tube 330. The diameter difference configuration ensures an interference fit of the plug member 414 within the outer tube 330. For example, the plug member 414 tightly abuts the internal sidewall 334 of the tubular portion 430 of the termination portion 410 of the outer tube 330. Further, the plug member 414 may be pre-formed to have a convex portion adjacent to the sensing end 412 of the outer tube to facilitate a swaging process of the sensing end 412.

In example operation 650, the sensing end 412 of the outer tube 330 is closed through swaging to form a closed end 412.

In example operation 660, the closed end 412 is sealed through a welding process to form the termination portion 410 of the outer tube 330.

In example operation 670, the termination portion 410 of the outer tube 330 is pressure tested.

Example embodiments are provided herein to facilitate an appreciation of the techniques, which are not meant to limit the scope of the disclosure. Variations from the provided embodiments without departing from the principles of the disclosure are possible and included. Further, the embodiments and components thereof may be combined in various ways, which are also included in the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical fiber cable, comprising:
an optical fiber sensor having a first end and a second end;
a first metal tube having a longitudinal tubular portion and a first termination portion, the longitudinal tubular portion containing the optical fiber sensor and having a substantially consistent diameter from the first end of the optical fiber to the second end of the optical fiber, the first termination portion being integrated to the longitudinal tubular portion as a one-piece structure adjacent to the first end of the optical fiber sensor, the first termination portion including a first closed end of the first metal tube that includes a convex external shape; and
an encapsulation layer surrounding the first metal tube.

2. The optical fiber cable of claim 1, wherein the first termination portion further includes a tubular portion adjacent to the first closed end and wherein the first closed end includes a smooth transition toward the tubular portion.

3. The optical fiber cable of claim 2, wherein the first termination portion further includes a plug member positioned at least partially inside the tubular portion and substantially fitting into the first closed end.

4. The optical fiber cable of claim 1, further comprising a second metal tube that contains the first end of the optical fiber sensor and is contained in the first metal tube.

5. The optical fiber cable of claim 4, wherein the second metal tube is separated from the first metal tube by a support layer.

6. The optical fiber cable of claim 4, wherein the second metal tube is substantially centralized within the first metal tube.

7. The optical fiber cable of claim 5, wherein the second metal tube includes a second termination portion adjacent to the first end of the optical fiber sensor.

8. The optical fiber cable of claim 7, wherein the second termination portion includes a crimped end of the second metal tube.

9. The optical fiber cable of claim 7, wherein the second termination portion includes a swaged end of the second metal tube.

10. The optical fiber cable of claim 7, wherein the second termination portion is separated from the first termination portion by a gap.

11. The optical fiber cable of claim 1, wherein the first closed end of the first metal tube is swaged and welded.

12. The optical fiber cable of claim 1, further comprising a strength member adjacent to the first metal tube and surrounded by the encapsulation layer.

13. An optical fiber core, comprising:
   an optical fiber having a first end;
   an inner tube having a first termination portion that fully contains the first end of the optical fiber; and
   an outer tube at least partially containing the inner tube and having a second termination portion that fully contains the first termination portion of the inner tube, the second termination portion including a swaged and welded end.

14. The optical fiber core of claim 13, wherein the first termination portion of the inner tube includes a crimped end.

15. The optical fiber core of claim 13, further comprising a filler material positioned between the optical fiber and an internal sidewall of the inner tube.

16. A method, comprising:
   forming a first metal tube surrounding an optical fiber having a first end;
   closing an end of the first metal tube adjacent to the first end of the optical fiber through crimping;
   forming a second metal tube surrounding the first metal tube;
   after the forming the second metal tube, closing an end of the second metal tube adjacent to the end of the first metal tube through swaging; and
   sealing the end of the second metal tube through welding.

\* \* \* \* \*